United States Patent
Ogino et al.

(10) Patent No.: US 12,039,817 B2
(45) Date of Patent: Jul. 16, 2024

(54) GATE SYSTEM

(71) Applicant: NEC Corporation, Tokyo (JP)

(72) Inventors: Yuka Ogino, Tokyo (JP); Keiichi Chono, Tokyo (JP); Kazuya Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 17/767,546

(22) PCT Filed: Nov. 5, 2019

(86) PCT No.: PCT/JP2019/043283
§ 371 (c)(1),
(2) Date: Apr. 8, 2022

(87) PCT Pub. No.: WO2021/090365
PCT Pub. Date: May 14, 2021

(65) Prior Publication Data
US 2023/0186703 A1    Jun. 15, 2023

(51) Int. Cl.
*G07C 9/10*    (2020.01)
*G06V 40/16*   (2022.01)
(Continued)

(52) U.S. Cl.
CPC .............. *G07C 9/10* (2020.01); *G06V 40/172* (2022.01); *G06V 40/197* (2022.01); *G07C 9/37* (2020.01)

(58) Field of Classification Search
CPC .......... G07C 9/10; G07C 9/37; G06V 40/197; G06V 40/172
(Continued)

(56) References Cited

U.S. PATENT DOCUMENTS 5,845,692 A * 12/1998 Kellem ................... E05G 5/003
                                                          160/187
6,119,096 A *  9/2000 Mann ..................... G06Q 10/02
                                                          705/40
(Continued)

FOREIGN PATENT DOCUMENTS

CN         208654873 U     3/2019
JP         H09-198531 A    7/1997
(Continued)

OTHER PUBLICATIONS

JP Office Action for JP Application No. 2021-554439, dated Apr. 4, 2023 with English Translation.
(Continued)

*Primary Examiner* — Kam Wan Ma

(57) ABSTRACT

Provided is a gate system arranged between a first region and a second region, including a guide that defines a movement path of a user from the first region to the second region and an imaging device that photographs the user to acquire an image used for biometric authentication. The movement path includes a first portion in which the user is photographed and a second portion through which the user passes after being photographed. The first portion extends from the first region toward the imaging device in a first direction that is parallel to an optical axis of the imaging device. The second portion extends from an end of the first portion in a second direction that is not parallel to the first direction.

15 Claims, 16 Drawing Sheets

(51) Int. Cl.
*G06V 40/18* (2022.01)
*G07C 9/37* (2020.01)

(58) Field of Classification Search
USPC .......................................................... 340/5.7
See application file for complete search history.

(56) References Cited

U.S. PATENT DOCUMENTS

| | | | |
|---|---|---|---|
| 2001/0054951 A1 | 12/2001 | Kimoto et al. | |
| 2004/0240711 A1* | 12/2004 | Hamza ................. | G06V 40/172 382/118 |
| 2008/0080748 A1 | 4/2008 | Sukegawa | |

FOREIGN PATENT DOCUMENTS

| | | |
|---|---|---|
| JP | 2001-512262 A | 8/2001 |
| JP | 2002-008070 A | 1/2002 |
| JP | 2004-266660 A | 9/2004 |
| JP | 2007-516503 A | 6/2007 |
| JP | 2008-108243 A | 5/2008 |
| JP | 2009-199474 A | 9/2009 |
| JP | 2014-167799 A | 9/2014 |
| JP | 2017-162211 A | 9/2017 |
| JP | 2018-092293 A | 6/2018 |
| JP | 2019-185300 A | 10/2019 |
| WO | 2009/016846 A1 | 2/2009 |

OTHER PUBLICATIONS

Extended European Search Report for EP Application No. 19951937.2, dated on Oct. 13, 2022.
International Search Report for PCT Application No. PCT/JP2019/043283, mailed on Jan. 28.2020.

* cited by examiner

GATE SYSTEM

This application is a National Stage Entry of PCT/JP2019/043283 filed on Nov. 5, 2019, the contents of all of which are incorporated herein by reference, in their entirety.

TECHNICAL FIELD

This disclosure relates to a gate system.

BACKGROUND ART

Patent Literature 1 discloses an iris authentication device having a camera for iris authentication and an automatic door that operates in accordance with an authentication result. The camera is arranged at an angle at which the iris of the passing user can be imaged obliquely. Patent Literature 2 discloses a gate device having a camera for face authentication.

CITATION LIST

Patent Literature

PTL 1: International Publication No. JPWO2009/016846
PTL 2: Japanese Patent Application Laid-Open No. 2009-199474

SUMMARY OF INVENTION

Technical Problem

In a gate system that performs biometric authentication by imaging a passing user as described in Patent Literature 1 or Patent Literature 2, an accuracy of biometric authentication may not be sufficiently secured depending on the imaging angle of the user.

An object of this disclosure is to provide a gate system capable of performing biometric authentication of a passing user with higher accuracy.

Solution to Problem

According to an aspect of this disclosure, there is provided a gate system arranged between a first region and a second region, including a guide that defines a movement path of a user from the first region to the second region and an imaging device that photographs the user to acquire an image used for biometric authentication. The movement path includes a first portion in which the user is photographed and a second portion through which the user passes after being photographed. The first portion extends from the first region toward the imaging device in a first direction that is parallel to an optical axis of the imaging device. The second portion extends from an end of the first portion in a second direction that is not parallel to the first direction.

Advantageous Effects of Invention

According to this disclosure, a gate system capable of performing biometric authentication of a passing user with higher accuracy is provided.

DESCRIPTION OF EMBODIMENTS

Figure 1:
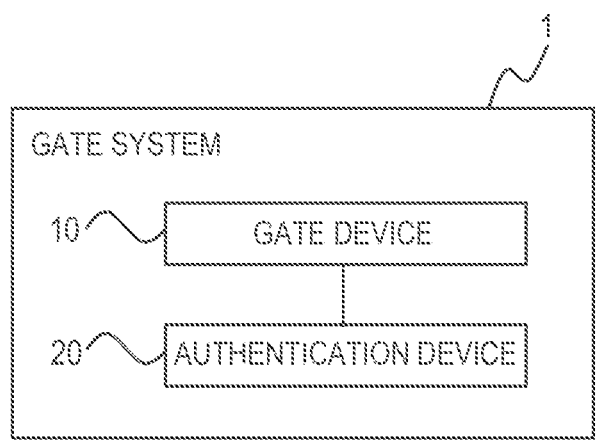
FIG. 1 is a block diagram illustrating a schematic configuration of a gate system according to a first example embodiment.

Hereinafter, exemplary embodiments of this disclosure will be described with reference to the drawings. In the drawings, similar or corresponding elements are denoted by the same reference numerals, and the description thereof may be omitted or simplified.

First Example Embodiment

FIG. 1 is a block diagram illustrating a schematic configuration of a gate system according to a first example embodiment. The gate system 1 includes a gate device 10 and an authentication device 20. The gate device 10 and the authentication device 20 are communicatively connected to each other.

The gate system 1 is a system for managing movement of users between regions by biometric authentication. The gate system 1 can be used, for example, for a security gate of a building, an entry gate of an event venue, an entrance/exit gate in a station premises, a gate between management regions of an airport, an entrance/exit gate of an unmanned payment store, and the like.

The gate device 10 is arranged between the first region and the second region in which the management states are different from each other. For example, if the gate device 10 is an entrance gate of an event venue, the first region is outside the event venue and the second region is inside the event venue. An imaging device provided in the gate device 10 captures an image of a user who tries to move from the first region to the second region. An image obtained by the capturing is used for biometric authentication in the authentication device 20.

The authentication device 20 performs biometric authentication for matching a user against a registrant using an image of the user captured by the gate device 10. The authentication method in the authentication device 20 may be, for example, face authentication for matching a person based on a feature in a face of the user, or iris authentication for matching a person based on a feature in a pattern of the iris of the user. Alternatively, the authentication device 20 may perform two-element authentication in which authentication is performed by performing matching using both the face image and the iris image and integrating the results of those. In the following description, unless otherwise specified, the authentication device 20 performs iris authentication using an image including an iris of a user.

Note that the configuration of the gate system 1 is an example, and for example, the gate system 1 may further include a device other than the gate device 10 and the authentication device 20. The gate device 10 and the authentication device 20 may be integrally provided in the same device or may be provided at separate locations.

Figure 2:
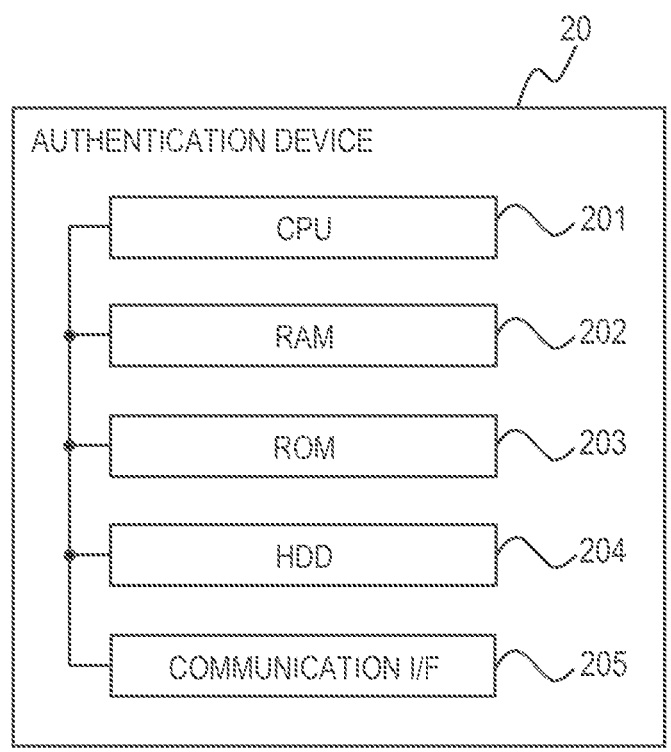
FIG. 2 is a block diagram illustrating a hardware configuration of an authentication device according to the first example embodiment.

FIG. 2 is a block diagram illustrating a hardware configuration of the authentication device 20 according to the first example embodiment. The authentication device 20 is a computer such as a personal computer (PC) or a server. The authentication device 20 includes a central processing unit (CPU) 201, a random access memory (RAM) 202, a read only memory (ROM) 203, a hard disk drive (HDD) 204, and a communication interface (I/F) 205. The components of the authentication device 20 are connected to each other via a bus, wiring, a driving device, and the like.

The CPU 201 is a processor that performs predetermined calculations in accordance with programs stored in the ROM 203 and the HDD 204, and also has a function of controlling each unit of the authentication device 20. The RAM 202 is constituted by a volatile storage medium, and provides a temporary memory area necessary for the operation of the CPU 201. The ROM 203 is constituted by a non-volatile storage medium, and stores necessary information such as a program used for the operation of the authentication device 20. The HDD 204 is constituted by a non-volatile storage medium, and is a storage device for temporarily storing data acquired from the gate device 10 or the like, storing a feature amount of a registrant, storing an operation program of the authentication device 20, and the like.

The communication I/F 205 is a communication interface based on a standard such as Ethernet (registered trademark) or Wi-Fi (registered trademark), and is a module for performing communication with the gate device 10.

Note that the hardware configuration illustrated in FIG. 2 is an example, and other devices may be added or some of the devices may not be provided. Further, some devices may be replaced by other devices having similar functions. For example, the authentication device 20 may further include an input device such as a keyboard, a pointing device, or a button so that an operation by the administrator of the authentication device 20 can be received. The authentication device 20 may further include a display device such as a display, a speaker, and an indicating lamp for providing information to the administrator. Thus, the hardware configuration illustrated in FIG. 2 can be changed as appropriate.

Figure 3:
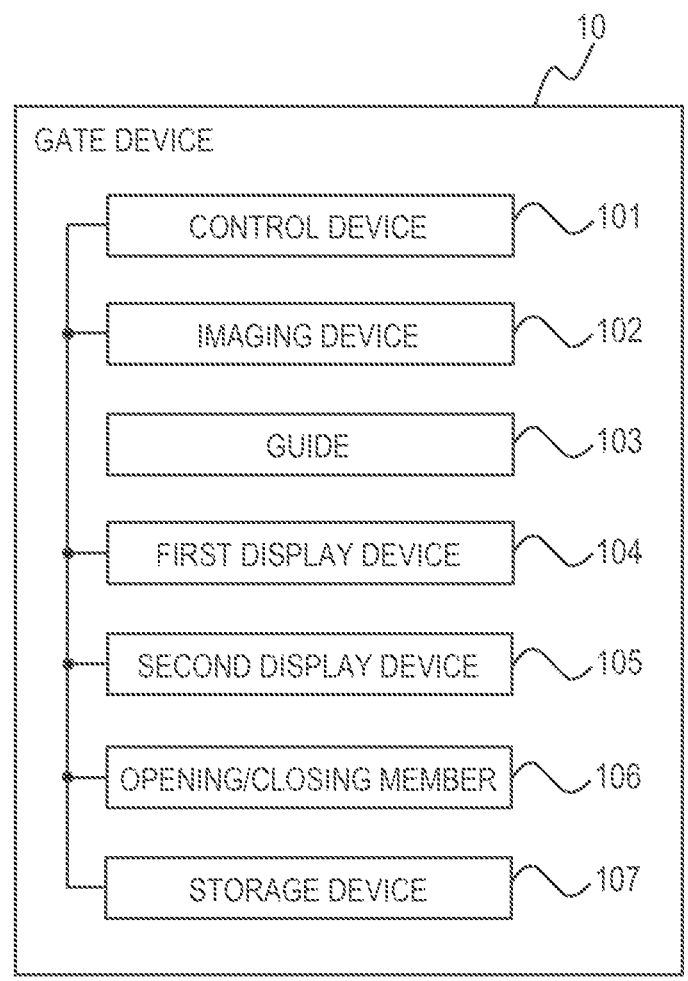
FIG. 3 is a block diagram illustrating a hardware configuration of a gate device according to the first example embodiment.

FIG. 3 is a block diagram illustrating a hardware configuration of the gate device 10 according to the first example embodiment. The gate device 10 includes a control device 101, an imaging device 102, a guide 103, a first display device 104, a second display device 105, an opening/closing member 106, and a storage device 107.

The control device 101 controls the imaging device 102, the first display device 104, the second display device 105, the opening/closing member 106, and the storage device 107. The control device 101 has a communication function of transmitting and receiving information to and from the authentication device 20. A specific hardware configuration of the control device 101 may be, for example, a computer similar to the authentication device 20 illustrated in FIG. 2, or may be a dedicated control circuit.

The imaging device 102 is a device that captures an image of a user who tries to move from the first region to the second region to acquire an image of the user. The imaging device 102 may be a visible light camera that captures an image by visible light, may be an infrared camera that captures an image by infrared light, or may include both the visible light camera and the infrared camera. The imaging device 102 may include a light source that emits light of at least one band of visible light and infrared light.

The guide 103 defines a movement path of the user from the first region to the second region. The guide 103 may be, for example, a plurality of fences provided on boundaries of lanes on which the users moves. By guiding the user to pass between the two fences, the guide 103 can define the movement path for the user. The fences may be fixed or movable.

Further, the guide 103 is not limited to physically defining the movement path of the user, such as fences, but may indicate the movement path to the user by, for example, a line or a message drawn on a floor. The line or message may be displayed by light projected from a projector to the floor.

The first display device 104 and the second display device 105 are liquid crystal displays, organic light emitting diode (OLED) displays, projectors, and the like, and are used to present information to the user.

The first display device 104 displays information indicating whether or not the user can enter an entrance of the gate device 10 to the user. The first display device 104 may indicate, for example, whether or not entry is possible by characters such as "passable", "impassable", figures such as "O mark", "X mark", and the like, colors such as "red", "green", and the like, but is not particularly limited. When the gate device 10 has a plurality of entrances, the first display device 104 may display an arrow or the like indicating an entrance that the user can enter.

The second display device 105 displays information indicating whether or not the user can pass the gate device 10 to the user. The possibility of the passage is determined in accordance with the result of the biometric authentication in the authentication device 20. The second display device 105 may display similar information to that of the first display device 104.

The opening/closing member 106 is provided so as to be openable and closable in accordance with a result of biometric authentication in the authentication device 20. The opening/closing member 106 may be, for example, a flapper. The opening/closing member 106 is arranged in the movement path of the user between the first region and the second region, and movement of the user is prevented when the opening/closing member 106 is in the closed state.

The storage device 107 is an HDD or the like, and stores data such as an image acquired by the imaging device 102 and an operation program of the control device 101. The storage device 107 may be provided outside the gate device 10.

Figure 4:
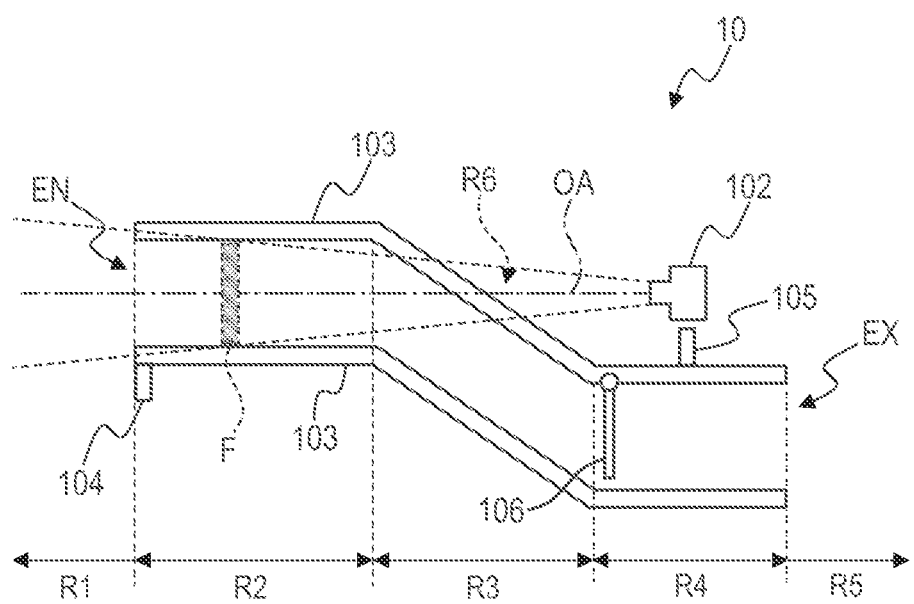
FIG. 4 is a schematic plan view illustrating the overall configuration of the gate device according to the first example embodiment.

FIG. 4 is a schematic plan view illustrating the overall configuration of the gate device 10 according to the first example embodiment. The gate device 10 is arranged between the region R1 (a first region) and the region R5 (a second region). The guide 103 has an entrance EN and an exit EX. The entrance EN faces region R1 and the exit EX faces region R5.

The movement path of the user defined by the guide 103 is divided into regions R2, R3, and R4. The region R2 is a region in which photographing of the user is performed. The region R2 (a first portion of the movement path) extends in parallel with the optical axis OA of the imaging device 102 in a direction (a first direction) from the entrance EN facing the region R1 toward the imaging device 102. The region R2 is arranged such that at least a part thereof is included in a region R6 which is an imaging range of the imaging device 102. A focal point F of the optical system of the imaging device 102 is arranged so as to be included in the region R2. As a result, it is possible to capture an image focused on the user in the region R2.

The region R3 (a second portion of the movement path) is a region in which the user moves away from the front of the imaging device 102 toward the outside of the imaging range after being photographed. The region R3 extends from the end of the region R2 in a direction (a second direction) that is not parallel to the direction in which the region R2 extends (that is, the direction of the optical axis OA).

The region R4 is a region in which the user after being photographed passes through the side of the imaging device 102. The region R4 extends in a direction from the end of the region R3 toward the region R5. An opening/closing member 106 is provided in the region R4.

The first display device 104 is provided in the vicinity of the beginning of the region R2. More specifically, the first display device 104 is provided at a position closer to the beginning of the region R2 than the range in which the user is photographed (vicinity of the focal point F). Thus, the first display device 104 can appropriately present information to the user moving from the region R1 toward the entrance EN. The first display device 104 may be incorporated in the guide 103, may be provided at an upper portion or a side portion of the guide 103, or may be provided at a position away from the guide 103.

The second display device 105 is provided in the vicinity of the imaging device 102. More specifically, the second display device 105 is provided at a position closer to the imaging device 102 than a range in which the user is photographed (vicinity of the focal point F). Thus, the second display device 105 can appropriately present information to the user that watches the imaging device 102 from the region R2. The second display device 105 may be incorporated in the guide 103, may be provided in contact with the guide 103, or may be provided at a position away from the guide 103. The second display device 105 may be incorporated in the same housing as the imaging device 102 or may be provided separately from the imaging device 102.

Figure 5:
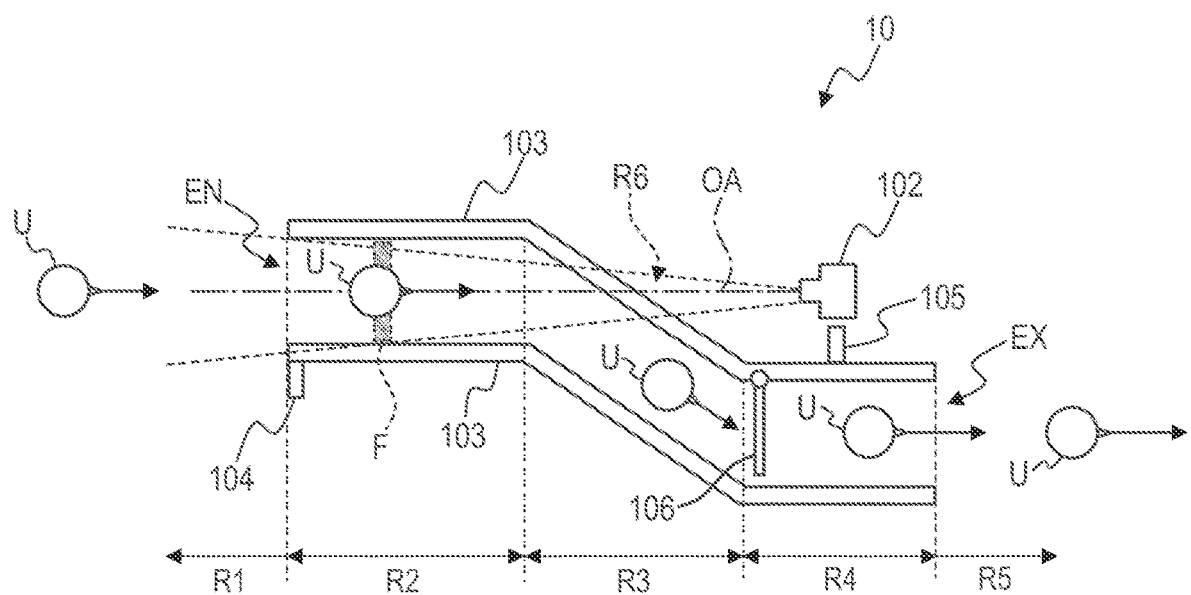
FIG. 5 is a schematic plan view for explaining a movement path of a user in the gate device according to the first example embodiment.
Figure 6:
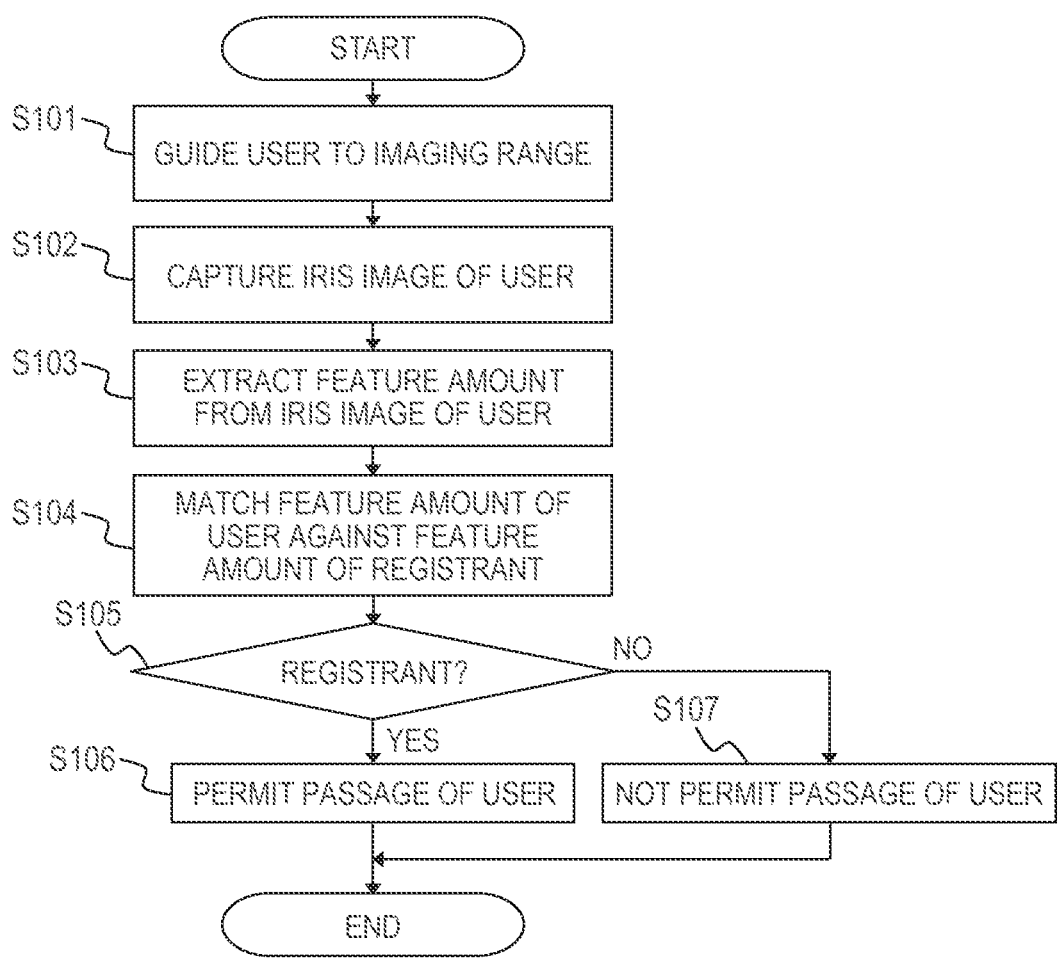
FIG. 6 is a flowchart schematically illustrating an operation of the gate system according to the first example embodiment.

FIG. 5 is a schematic plan view for explaining a movement path of a user in the gate device 10 according to the first example embodiment. FIG. 6 is a flowchart schematically illustrating the operation of the gate system 1 according to the first example embodiment. A plurality of users U illustrated in FIG. 5 schematically indicate users in the regions R1, R2, R3, R4, and R5, respectively. The arrow attached to the user U indicates moving direction, and the direction of the face of the user U usually identical to the direction of the arrow. The flowchart illustrated in FIG. 6 indicates processing performed when one user passes through the gate device 10 in time series. The operation of the gate system 1 will be described in accordance with the flowchart of FIG. 6 with reference to the position of the user illustrated in FIG. 5.

In step S101, the control device 101 guides the user U in the region R1 to the imaging range in the region R2 via the entrance EN. In this process, for example, the control device 101 may control the first display device 104 to display information such as an arrow indicating that the user U may enter the entrance EN. In the case where such an entrance permission is always displayed during the gate system 1 being in operation, the process of step S101 can be omitted.

In the case where the gate system 1 is separately provided with a voice guiding device such as a speaker, the process of step S101, the process of guiding by the control device 101, may be generating voice for guiding.

In step S102, the control device 101 performs a process of capturing an iris image of the user U in the region R2. This process may be, for example, a process in which the control device 101 controls the imaging device 102 to capture an image including the iris of the user U. In this processing, for example, a plurality of images are continuously captured at a predetermined frame rate, and an image obtained at a timing when the user U reaches a focal point F is selected as an iris image for matching. The acquired iris image is transmitted to the authentication device 20 for use in a subsequent authentication process. The acquired iris image may be stored in the storage device 107.

It is desirable that the angle of view of the imaging device 102 be set so that the irises of both eyes of the user U can be imaged simultaneously. In this case, many features can be acquired as compared with the case where only one eye is photographed in one photographing.

In step S103, the CPU 201 of the authentication device 20 extracts a feature amount from the captured iris image of the user U.

In step S104, the CPU 201 of the authentication device 20 matches the feature amount of the user U against the feature amount of one or a plurality of registrants previously stored in the HDD 204 of the authentication device 20 to determine whether or not the user U is the same person as any of the registrants. The registrant is a person authorized to pass through the gate device 10. This determination result is transmitted from the authentication device 20 to the gate device 10.

The authentication processing in steps S103 and S104 is performed during a period until the user U moves from the region R2 to the region R3.

When the CPU 201 of the authentication device 20 determines that the user U is a registrant (YES in step S105), the process proceeds to step S106. When the CPU 201 of the authentication device 20 determines that the user U is not a registrant (NO in step S105), the process proceeds to step S107.

In step S106, the control device 101 performs control for permitting passage of the user U. A specific example of this control is to control the opening/closing member 106 to the open state to allow the user U to pass through the region R4. In addition, the control device 101 may control the second display device 105 for displaying information indicating that the user U can pass through the gate device 10, thereby providing the user U with information indicating that the user U can or cannot pass through the gate device 10. By these processes, the user U is guided to the region R5.

When the opening/closing member 106 is controlled to be in the open state in step S106, the user U leaves the exit EX from the region R3 via the region R4 and moves to the region R5.

In step S107, the control device 101 performs control for not permitting passage of the user U. A specific example of this control is to control the opening/closing member 106 to the closed state to prevent the user U from passing through the region R4. In addition, the control device 101 may control the second display device 105 for displaying information indicating that the user U cannot pass through the gate device 10, thereby presenting information indicating that the user U can or cannot pass through the gate device 10.

When the opening/closing member 106 is controlled to be in the closed state in step S107, the user U cannot move to the region R4, and thus returns to the region R1. Alternatively, the user U may return to the region R2 and receive authentication again.

As described above, in the gate device 10 of the present example embodiment, the movement path of the user includes the first portion (the region R2) in which the photographing of the user is performed, and the second portion (the region R3) in which the user passes after being photographed. Here, the first portion extends from the first region toward the imaging device 102 in a first direction (the right direction in FIG. 4) that is parallel to the optical axis OA of the imaging device 102. The second portion extends from the end of the first portion in a second direction (the lower right direction in FIG. 4) that is not parallel to the first direction.

Generally, in an authentication method using an image such as iris authentication, authentication accuracy is improved by using an image obtained by photographing a face of a user from the front. In the present example embodiment, since the first portion where the user is photographed extends in the first direction along the optical axis of the imaging device 102, the user before being photographed moves toward the imaging surface of the imaging device 102 as illustrated in the region R2 of FIG. 5. Therefore, the imaging device 102 can capture an image of the face of the user from the front. This improves the accuracy of biometric authentication. In the present example embodiment, the second portion through which the user passes after being photographed extends in the second direction which is not parallel to the first direction. As illustrated in the region R3 in FIG. 5, the user after being photographed moves in a direction different from that of the imaging device 102. Thus, the user can move smoothly without being blocked by the imaging device 102. Therefore, even if the imaging device 102 is arranged at a position where the face of the user is imaged from the front, the passage of the user is not blocked. As described above, according to the present example embodiment, the gate device 10 capable of performing biometric authentication of a passing user with higher accuracy is provided.

In addition, since the user after being photographed moves toward a direction different from that of the imaging device 102 and quickly moves away from the imaging range, the possibility of failure of authentication due to overlapping of a plurality of users in the captured image is also reduced.

Second Example Embodiment

In the gate system 1 of the present example embodiment, the position of the opening/closing member 106 is different from that of the first example embodiment, but the other configurations are the same as those of the first example embodiment. Hereinafter, differences from the first example embodiment will be mainly described, and description of common portions will be omitted or simplified.

Figure 7:
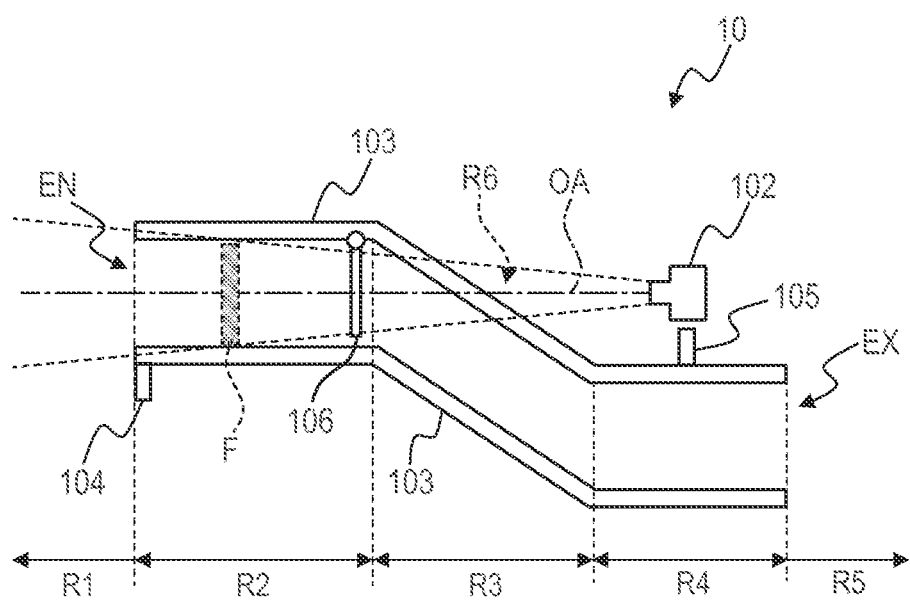
FIG. 7 is a schematic plan view illustrating an overall configuration of a gate device according to a second example embodiment.

FIG. 7 is a schematic plan view illustrating the overall configuration of the gate device 10 according to the second example embodiment. In the present example embodiment, the opening/closing member 106 is provided in the region R2. More specifically, the opening/closing member 106 is provided at a position closer to the imaging device 102 than the focal point F, which is a range in which the user is photographed. Also in this configuration, similarly to the first example embodiment, the opening/closing member 106 can be controlled in accordance with the authentication result to restrict the passage of the user.

Also in the present example embodiment, the same effects as those of the first example embodiment can be obtained. Further, in the configuration of the present example embodiment, since the distance between the position at which the imaging is performed and the opening/closing member 106 is short, when the imaging state is inappropriate and the passage is not permitted, the user can easily return to the imaging position, and the imaging can be easily performed again. Therefore, the gate device 10 of the present example embodiment can perform biometric authentication more smoothly than the configuration of the first example embodiment in the case where the operation capable of re-imaging is performed.

Figure 8:
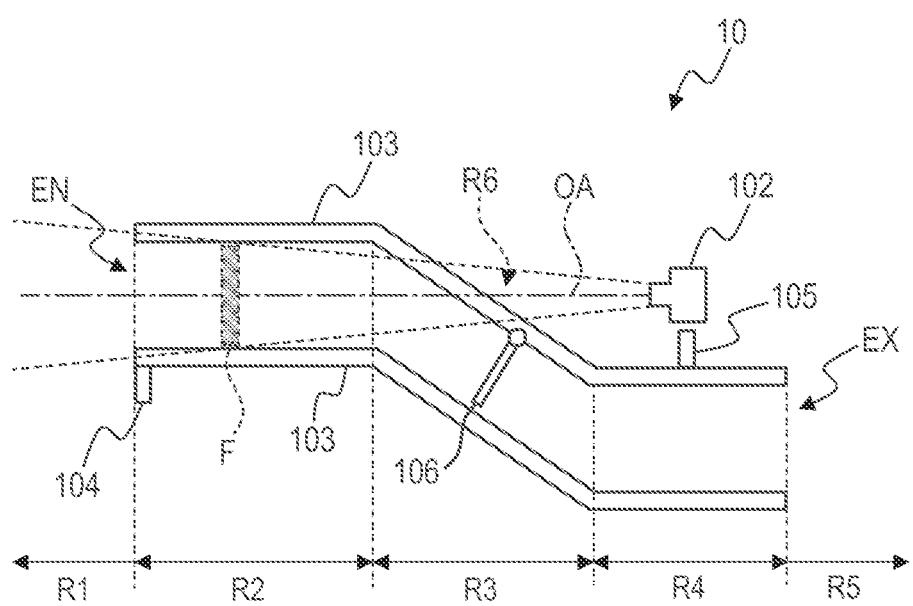
FIG. 8 is a schematic plan view illustrating an overall configuration of a gate device according to a modified example of the second example embodiment.

FIG. 8 is a schematic plan view illustrating an overall configuration of a gate device 10 according to a modified example of the second example embodiment. In this modified example, the opening/closing member 106 is provided in the region R3. Also in this configuration, similarly to the first example embodiment, the opening/closing member 106 can be controlled in accordance with the authentication result to restrict the passage of the user.

Also in this modified example, the same effects as those of the first example embodiment can be obtained. Further, in the present modified example, although the distance between the position at which the imaging is performed and the opening/closing member 106 is longer than that in the configuration of FIG. 7, since the distance is shorter than that in the configuration of FIG. 4, the re-imaging can be performed more easily than in the case of the first example embodiment. Therefore, also in the configuration of the present modified example, the gate device 10 can perform biometric authentication more smoothly than in the configuration of the first example embodiment in the case where the operation capable of re-imaging is performed.

Third Example Embodiment

The gate system 1 of the present example embodiment includes a plurality of gate devices of the first example embodiment, and has a structure in which two gate devices are connected in series. The configuration of each of the two gate devices is substantially the same as that of the first example embodiment. Hereinafter, differences from the first example embodiment will be mainly described, and description of common portions will be omitted or simplified.

Figure 9:
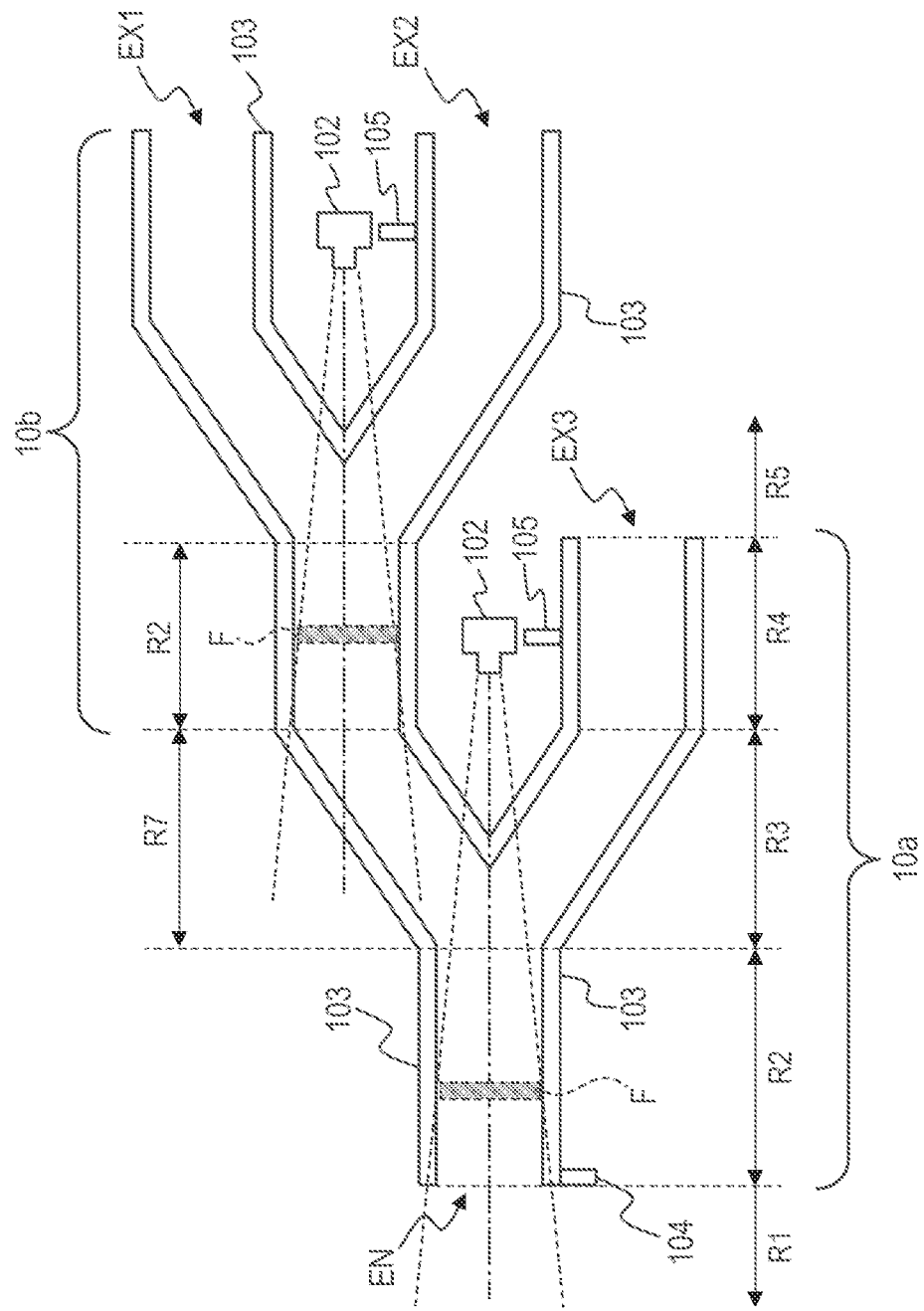
FIG. 9 is a schematic plan view illustrating an overall configuration of a gate system according to a third example embodiment.

FIG. 9 is a schematic plan view illustrating the overall configuration of a gate system 1 according to a third example embodiment. The gate system 1 includes two gate devices 10a and 10b, and a first gate device 10a and a second gate device 10b are connected in series.

The shape of the guide 103 in the gate device 10a is different from the shape of the guide 103 in the configuration described with reference to FIG. 4. The movement path of the user defined by the guide 103 further includes a region R7 (a third portion) in addition to the regions R2, R3, and R4. The end of the region R2 is branched into the region R3 and the region R7. In other words, the region R7 extends from the end of the region R2 in a direction (a third direction) not parallel to the direction in which the region R2 extends (that is, the direction of the optical axis OA) and not parallel to the direction in which the region R3 extends. The user is guided to either the region R3 or the region R7 in accordance with the result of biometric authentication. In the present example embodiment, the end of the region R4 is referred to as an exit EX3.

The end of the region R7 is connected to the beginning of the region R2 of the gate device 10b, and the user passing through the region R7 is guided to the entrance of the gate device 10b. Like the gate device 10a, the gate device 10b also branches into two regions. The user is guided to the exit EX1 or the exit EX2 through either of the two regions in accordance with the result of biometric authentication.

Although the opening/closing member 106 is not illustrated in FIG. 9, the opening/closing member 106 may or may not be provided at a position as described in the first example embodiment or the second example embodiment. In the following description, it is assumed that the opening/closing member 106 is not provided, and the second display device 105 guides the movement direction of the user by displaying guidance.

Figure 10:
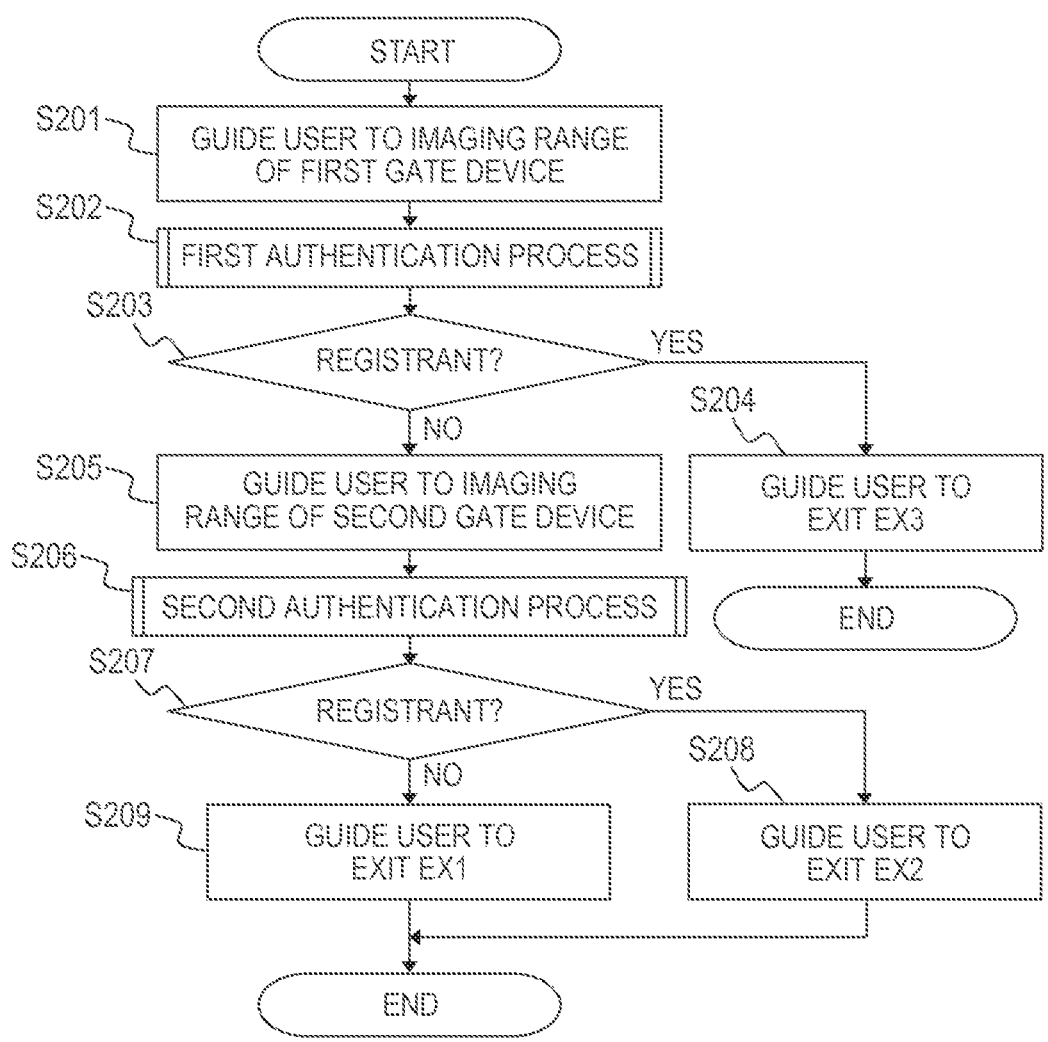
FIG. 10 is a flowchart illustrating an outline of an operation of the gate system according to the third example embodiment.

FIG. 10 is a flowchart schematically illustrating the operation of the gate system 1 according to the third example embodiment. The flowchart illustrated in FIG. 10 indicates the processing performed when one user passes through the gate devices 10a and 10b in time series.

In step S201, the control device 101 guides the user in the region R1 to the imaging range in the region R2 of the gate device 10a via the entrance EN. This process is the same as step S101 of the first example embodiment.

In step S202, the gate device 10a and the authentication device 20 perform a first authentication process. The contents of the first authentication process are the same as those of steps S102, S103, and S104 in FIG. 6, and therefore the description thereof will be omitted.

When the CPU 201 of the authentication device 20 determines that the user is a registrant (YES in step S203), the process proceeds to step S204. When the CPU 201 of the authentication device 20 determines that the user is not a registrant (NO in step S203), the process proceeds to step S205.

In step S204, the control device 101 performs control for guiding the user to the exit EX3. As a specific example of this control, a guidance indicating a direction in which the user should move by an arrow or the like may be displayed on the second display device 105. When the user leaves the exit EX3 and moves to the region R5 in accordance with the guidance, the process ends.

In step S205, the control device 101 performs control for guiding the user into the imaging range of the gate device 10b. When the user moves to the gate device 10b in accordance with the guidance, the gate device 10b and the authentication device 20 perform the second authentication process in step S206. The contents of the second authentication process are the same as those of steps S102, S103, and S104 in FIG. 6, and therefore the description thereof will be omitted.

When the CPU 201 of the authentication device 20 determines that the user is a registrant (YES in step S207), the process proceeds to step S208. When the CPU 201 of the authentication device 20 determines that the user is not a registrant (NO in step S207), the process proceeds to step S209.

In step S208, the control device 101 performs control for guiding the user to the exit EX2. In step S209, the control device 101 performs control for guiding the user to the exit EX1. When the user leaves the exit EX1 or the exit EX2 according to guidance, the process ends.

Since the exit EX1 is an exit from which a user who has not been determined to be a registrant leaves, the exit EX1 is connected to a region different in management state from the exits EX2 and EX3. Since both the exit EX2 and the exit EX3 are exits where the user who is determined to be a registrant leaves, the exit EX2 and the exit EX3 may be connected thereafter, or the exit EX2 and the exit EX3 may be the same exit.

Also in the present example embodiment, the same effects as those of the first example embodiment can be obtained. In the configuration of the present example embodiment, the user determined to be a registrant and the user determined not to be a registrant are guided to different movement paths. Therefore, even when it is determined that a certain user is not a registrant, the user does not stay in the gate devices 10a and 10b and a flow of people is not stopped. Further, in the present example embodiment, since the two gate devices 10a and 10b are connected in series, even when authentication in the gate device 10a fails due to an error such as imaging or matching processing, re-authentication can be performed in the gate device 10b without stopping a flow of people. Therefore, biometric authentication can be performed more smoothly.

Fourth Example Embodiment

As an example of the imaging device 102 in the above-described example embodiment, a specific configuration example of the imaging device 102 that can be used for iris authentication will be described as a fourth example embodiment. The imaging device 102 of the present example embodiment is a device that captures an image including an iris of the user passing through.

Figure 11:
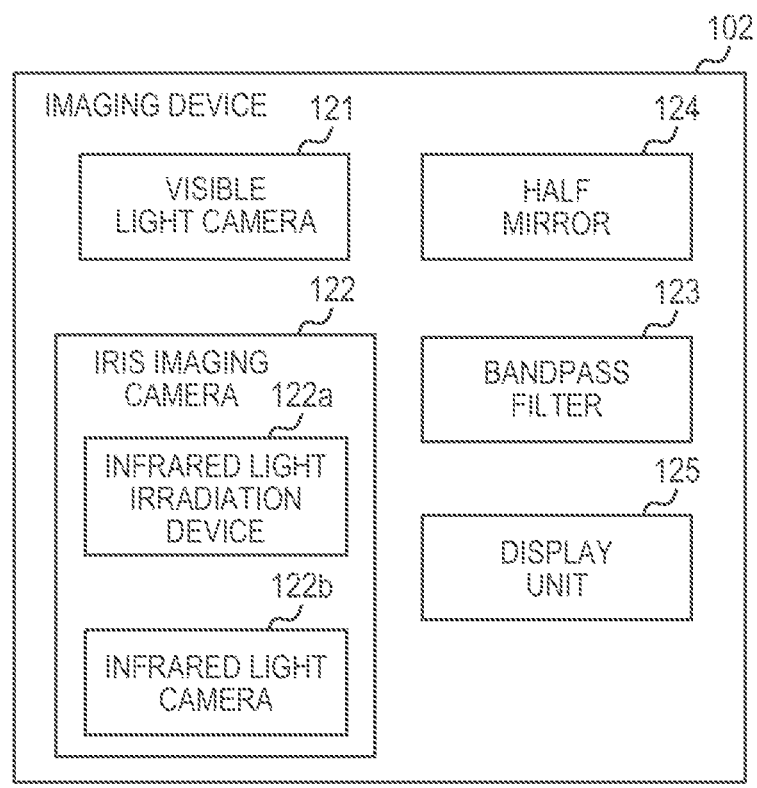
FIG. 11 is a block diagram illustrating an overall configuration example of an imaging device according to a fourth example embodiment.

FIG. 11 is a block diagram illustrating an overall configuration example of an imaging device 102 according to a fourth example embodiment. The imaging device 102 captures an image of a user existing in the authentication region based on a control information input from the control device 101, and outputs the captured image to the control device 101. The imaging device 102 according to the present example embodiment includes a visible light camera 121, an iris imaging camera 122, a bandpass filter 123, a half mirror 124, and a display unit 125.

The visible light camera 121 is an imaging device that captures an image of a face, eyes, or the like of a user with visible light. The visible light camera 121 captures an overall image (a first image) including at least a part of the face of the authentication subject. As the visible light camera 121, a digital camera using a complementary metal oxide semiconductor (CMOS) image sensor, a charge coupled device (CCD) image sensor, or the like may be used so as to be suitable for image processing in the control device 101. The visible light camera 121 may further include a light source for irradiating the user with illumination light.

The iris imaging camera 122 is an imaging device including an infrared light irradiation device 122a and an infrared light camera 122*b*, and captures an image (a second image) of an eye of the user by infrared light. That is, the imaging device 102 according to the present example embodiment includes two types of cameras that capture images of users using light in different wavelength ranges.

The infrared light irradiation device 122*a* includes a light emitting element such as an infrared light LED that emits infrared light. The wavelength of the infrared light irradiated from the infrared light irradiation device 122*a* may be, for example, in a near-infrared region of about 800 nm.

The infrared light camera 122*b* includes a light receiving element configured to be sensitive to infrared light. A digital camera using a CMOS image sensor, a CCD image sensor, or the like may be used as the infrared light camera 122*b*. The infrared light is irradiated from the infrared light irradiation device 122*a* to the eye of the user, and the infrared light reflected by the iris is photographed by the infrared light camera 122*b*, thereby acquiring an image of the eye including the iris image used for iris authentication. By acquiring an iris image captured by infrared light, a high-contrast image can be obtained irrespective of the color of the iris, and the influence of reflection by the cornea can be reduced.

The bandpass filter 123 is an optical filter having a pass band in the infrared region and a blocking band in the visible region. That is, the bandpass filter 123 is capable of selectively transmitting infrared light of a desired wavelength without transmitting visible light incident from the user side.

The half mirror 124 reflects a part of visible light incident from the user side and transmits another part of visible light. The bandpass filter 123 and the half mirror 124 in the present example embodiment have mirror surfaces that reflect visible light. Thus, the user can check his/her face on the mirror surfaces of the bandpass filter 123 and the half mirror 124.

The display unit 125 corresponds to the second display device 105 of the above-described example embodiment. In other words, in the present example embodiment, the second display device 105 is incorporated in the imaging device 102 as the display unit 125.

The control device 101 detects the position of the eye of the user (an authentication subject) based on the overall image captured by the visible light camera 121, selects the infrared light camera 122*b* corresponding to the height of the eye of the user, and captures an image of the iris of the user.

Further, the control device 101 extracts an iris image from the eye image captured by the infrared light camera 122*b*, and requests the authentication device 20 to execute iris authentication based on the iris image. Then, the control device 101 displays the authentication result in the authentication device 20 on the display unit 125. In a state where characters or the like are displayed on the display unit 125, since the line of sight of the user is easily guided toward the display unit 125, the control device 101 preferably controls the display unit 125 to be non-displayed before capturing an image of the iris of the user by the infrared light camera 122*b*.

Figure 12:
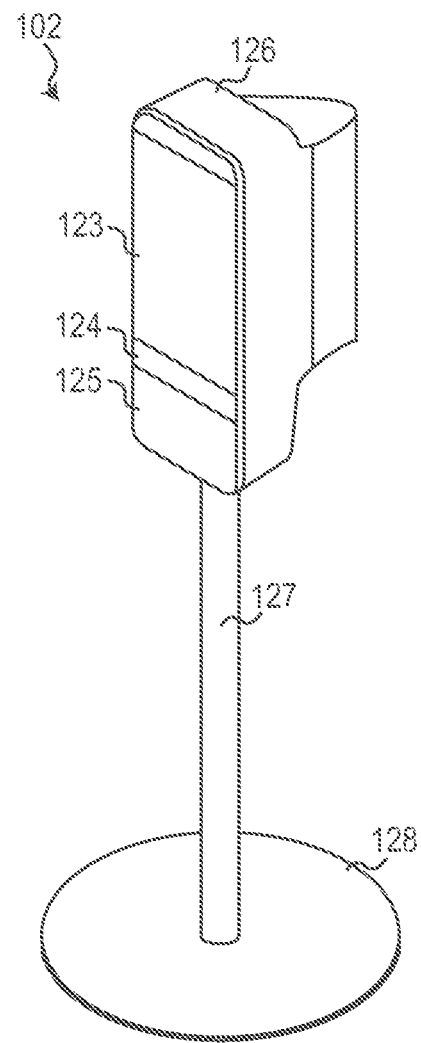
FIG. 12 is a perspective view of the imaging device according to the fourth example embodiment.
Figure 13:
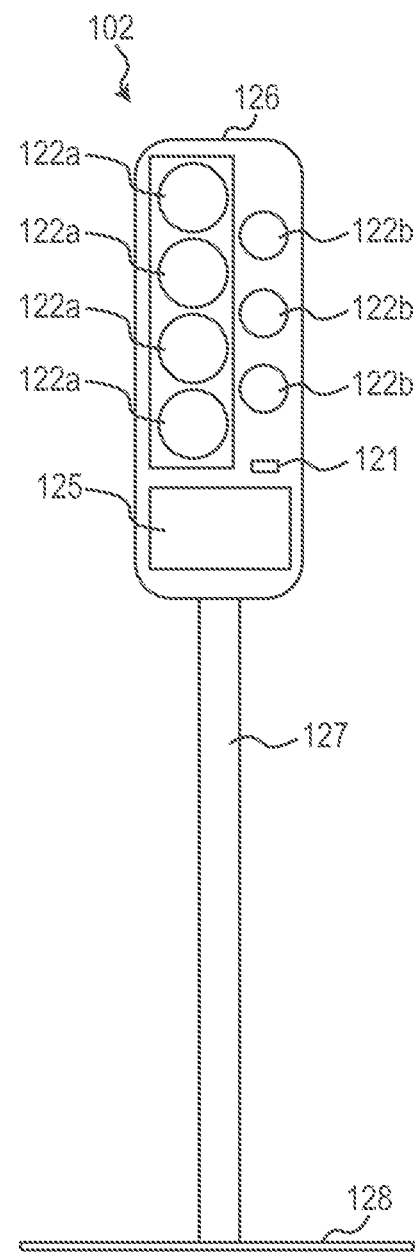
FIG. 13 is a front view of the imaging device according to the fourth example embodiment.
Figure 14:
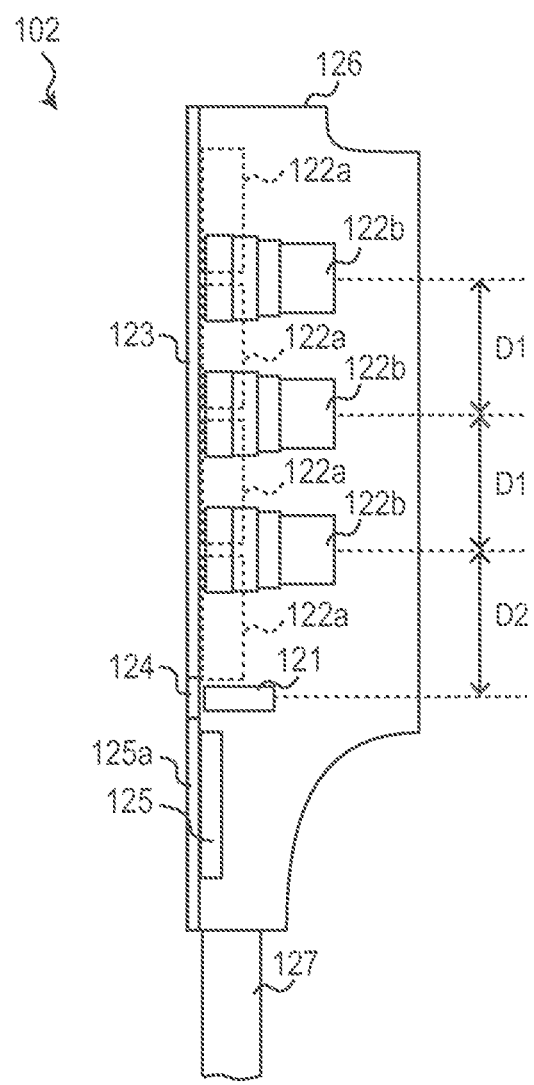
FIG. 14 is a transparent side view of the imaging device according to the fourth example embodiment.

Next, the structure of the imaging device 102 will be described with reference to FIGS. 12 to 14. FIG. 12 is a perspective view of the imaging device 102. FIG. 13 is a front view of the imaging device 102. FIG. 14 is a transparent side view of the imaging device 102.

In FIG. 12, the bandpass filter 123, the half mirror 124, and the display unit 125 are arranged on the same side of a housing 126. The bandpass filter 123 is arranged above the half mirror 124 in the vertical direction. On the other hand, the display unit 125 is arranged below the half mirror 124 in the vertical direction. The visible light camera 121 and the iris imaging camera 122 are arranged in the housing 126 (see FIGS. 13 and 14).

A bottom portion of the housing 126 is connected to an upper end portion of the support post 127. The length of the support post 127 may be appropriately changed in accordance with the range of height of the authentication subject. In addition, it is preferable that an internal space be formed in the support post 127, and power supply cables (not illustrated) of the visible light camera 121, the iris imaging camera 122 (the infrared light irradiation device 122*a* and the infrared light camera 122*b*), and the display unit 125 be arranged in the internal space along the central axis. A lower end portion of the support post 127 is connected to a disk-shaped support base 128.

FIG. 13 illustrates the imaging device in a state where the bandpass filter 123, the half mirror 124, and a cover 125*a* (see FIG. 14) covering the front face of the display unit 125 are removed from the housing 126. As illustrated in FIGS. 13 and 14, on the left side of the housing 126, four infrared light irradiation devices 122*a* are arranged side by side in a vertical direction and in a straight line in a front view. On the right side of the four infrared light irradiation devices 122*a*, three infrared light cameras 122*b* are arranged side by side in the vertical direction and in a straight line.

As illustrated in FIG. 14, only one bandpass filter 123 is provided on the housing 126 so as not to cover the light receiving surface of the visible light camera 121 while covering the light receiving surface of each of the plurality of infrared light cameras 122*b*. Therefore, only infrared light of a predetermined wavelength can be selectively incident on the infrared light camera 122*b*. In addition, there is an advantage that attachment to the housing 126 is easy and manufacturing cost can be suppressed.

On the other hand, the half mirror 124 is provided so as to cover the light receiving surface of the visible light camera 121. Since the infrared light is not incident on the visible light camera 121, the control device 101 can detect the face (especially the eyes) of the user from the entire image with high accuracy.

The visible light camera 121 is arranged below the infrared light camera 122*b* and the bandpass filter 123. Therefore, the visible light camera 121 can capture an image of the face of the user more easily than when the visible light camera 121 is arranged above the infrared light camera 122*b* and the bandpass filter 123.

The three infrared light cameras 122*b* are arranged at a constant interval D1 in the vertical direction. This makes it easy to associate the height position of the eyes of the user who is the imaging target (or height range of the user) with the infrared light camera 122*b* used for photographing the iris. The distance D2 between the infrared light camera 122*b* at the lowest position and the visible light camera 121 may be different from or equal to the distance D1.

A transparent cover 125*a* made of acrylic resin or the like is provided on the front of the display unit 125. Instead of the cover 125*a*, the half mirror 124 may be provided.

Further, the light receiving surfaces of the three infrared light cameras 122*b* are aligned on a straight line at different heights in the vertical direction. Thus, the focal positions of the plurality of infrared light cameras 122*b* are aligned on a straight line in the vertical direction.

Figure 15:
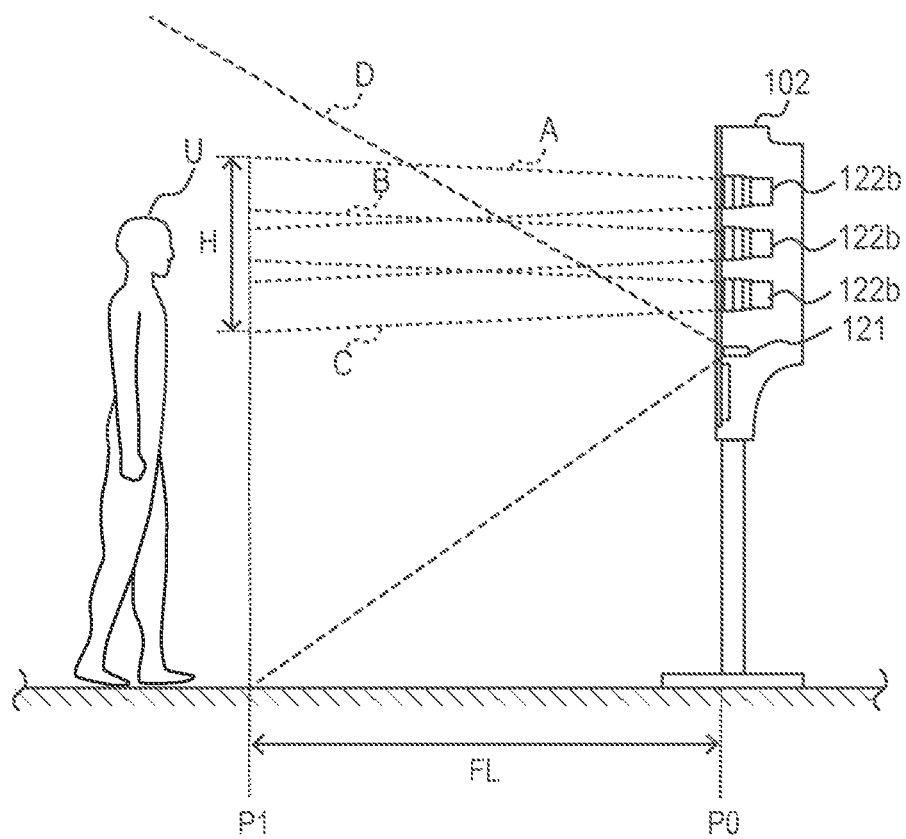
FIG. 15 is a diagram illustrating a visual field range in a vertical direction of the imaging device according to the fourth example embodiment.

FIG. 15 is a diagram illustrating a visual field range in the vertical direction of the imaging device 102. In this example, when the user U moves to a position P1, the imaging process is performed by any one of the three infrared light cameras 122*b*. The position P1 is separated from a position P0 where the imaging device 102 is arranged by the focal length FL. The visual field ranges of the three infrared light cameras 122b arranged in the vertical direction are indicated by broken lines. the visual field ranges A and B overlap at the position P1 in part and the visual field ranges B and C overlap at the position P1 in part. The three visual field ranges A, B, and C form one large visual field range as a whole. The length of the visual field range in the vertical direction is indicated by reference numeral H. It is assumed that the horizontal length of the visual field range is common among the three infrared light cameras 122b. The visual field range D of the visible light camera 121 is set to be wide enough to capture an image of the entire body of the user U. For example, at a position away from the visible light camera 121 by the focal length FL, the angle of view of the visible light camera 121 is set such that the visual field range D includes a range up to a height of about three meters from the ground in the vertical direction. Thus, when the user U is at the focal length FL of the infrared light camera 122b, the visible light camera 121 can substantially capture an image of the user U from the foot to the head irrespective of the height of the user U.

As described above, according to the present example embodiment, the imaging device 102 applicable to the gate device 10 of the first to third example embodiments is provided. Hereinafter, advantages of the imaging device 102 of the present example embodiment will be described.

Generally, in order to perform iris authentication with high accuracy, it is necessary to capture a high-resolution image at a high frame rate while the user U is in the depth of field. However, it is difficult to satisfy the level of the captured image required by one general-purpose camera.

On the other hand, in the imaging device 102 of the present example embodiment, three infrared light cameras 122b are arranged in the vertical direction, and the infrared light camera 122b for capturing an image of the eye region of the user U is selected. At this time, the control device 101 also determines a region of interest to be read out at high speed in the selected infrared light camera 122b. The region of interest is determined in consideration of, for example, the distance between both eyes arranged in the horizontal direction and the ordinary size of an eye. The control device 101 controls the imaging process of the imaging device 102 so that the iris is included in the region of interest. Thus, the control device 101 can acquire a high-resolution iris image. That is, even when the general-purpose infrared light camera 122b is used, the level of the captured image required for iris authentication can be satisfied.

Generally, in an authentication method using an image such as iris authentication, authentication accuracy is improved by using an image obtained by photographing a face of a user from the front. However, when the user can visually recognize a plurality of cameras from the outside, the user may see cameras other than a camera at an optimal height for capturing an iris image.

In contrast, in the present example embodiment, the light receiving surfaces of the plurality of infrared light cameras 122b are collectively covered by one bandpass filter 123 (optical filter). That is, since the imaging device 102 of the present example embodiment is configured such that the user cannot visually recognize the plurality of infrared light cameras 122b from the outside, the user naturally faces the front with respect to the imaging device 102, and the above-described problem does not occur. As described above, according to the present example embodiment, since the imaging device 102 can capture an image of the face of the user by the infrared light camera 122b positioned in front of the user, the authentication device 20 can perform iris authentication of the user with higher accuracy.

In particular, the bandpass filter 123 in the present example embodiment is visually recognized as a mirror surface when viewed from the user side. A mirror image of the user appears on the bandpass filter 123. The user naturally faces the imaging device 102 and directly view his/her own face appeared on the bandpass filter 123. Thus, since the user can easily check his/her face on the mirror surface, the accuracy of iris authentication can be further improved.

Therefore, according to the present example embodiment, the imaging device 102 in which the accuracy of iris authentication is improved is provided.

The devices described in the above example embodiment can also be configured as in the following fifth example embodiment.

Fifth Example Embodiment

Figure 16:
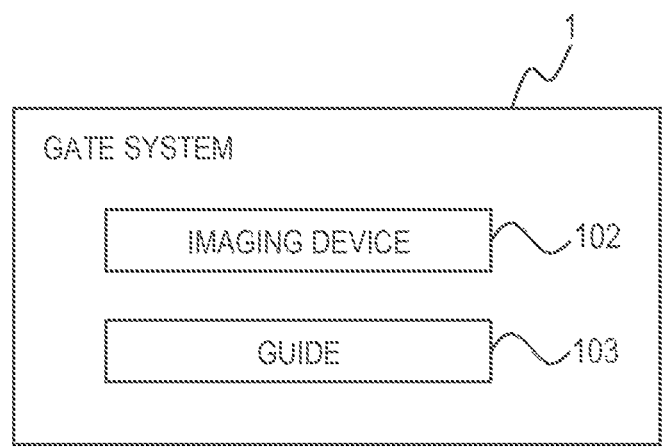
FIG. 16 is a block diagram illustrating a configuration of a gate system according to a fifth example embodiment.

FIG. 16 is a block diagram illustrating a configuration of a gate system according to a fifth example embodiment. The gate system 1 includes an imaging device 102 and a guide 103. The gate system 1 is arranged between a first region and a second region. The guide 103 defines a movement path of a user from the first region to the second region. The imaging device 102 photographs the user to acquire an image used for biometric authentication. The movement path includes a first portion in which the user is photographed and a second portion in which the user passes after being photographed. The first portion extends from the first region toward the imaging device 102 in a first direction that is parallel to an optical axis of the imaging device 102. The second portion extends from an end of the first portion in a second direction that is not parallel to the first direction.

According to the present example embodiment, there is provided a gate system 1 capable of performing biometric authentication of a passing user with higher accuracy.

Modified Example Embodiments

This disclosure is not limited to the above-described example embodiments, and can be suitably modified within the scope of this disclosure. For example, an example in which a configuration of a part of any example embodiment is added to another example embodiment or an example in which a configuration of a part of any example embodiment is replaced with a part of another example embodiment is also an example embodiment of this disclosure.

Although the iris authentication and the face authentication are exemplified as examples of the biometric authentication performed in the authentication device 20 in the above-described example embodiment, this disclosure is not limited thereto as long as the biometric information that can be extracted from the image of the user passing through the gate device 10 is used. For example, the biometric authentication performed in the authentication device 20 may be auricle authentication or gait authentication.

However, the biometric authentication performed in the authentication device 20 preferably includes at least iris authentication. This is because the authentication accuracy of iris authentication is easily influenced by the angle of imaging, so that the configuration of the above-described example embodiment in which imaging can be performed from the front is more effective. The biometric authentication performed in the authentication device 20 is preferably at least two-element authentication having iris authentication and face authentication. This is because authentication accuracy is further improved by matching using both the iris and the face to perform authentication.

A processing method in which a program for operating the configuration of the above-described example embodiment is stored in a storage medium so as to implement the functions of the above-described example embodiment, the program stored in the storage medium is read as code, and the program is executed in a computer is also included in the scope of each example embodiment. That is, a computer-readable storage medium is also included in the scope of the example embodiments. Further, not only the storage medium in which the above program is stored, but also the program itself is included in each example embodiment. In addition, one or more components included in the above-described example embodiments may be a circuit, such as an application specific integrated circuit (ASIC) and a field programmable gate array (FPGA), configured to implement the functions of each component.

As the storage medium, for example, a floppy (registered trademark) disk, a hard disk, an optical disk, a magneto-optical disk, a compact disk (CD)-ROM, a magnetic tape, a non-volatile memory card, or a ROM can be used. Further, the scope of each example embodiment is not limited to the case where the processing is executed by the program alone stored in the storage medium, and a case where the processing is executed by operating on an operating system (OS) in cooperation with the functions of other software and extension board is also included in the scope of each example embodiment.

The service realized by the functions of the above-described example embodiments may be provided to the user in the form of software as a service (SaaS).

It should be noted that all of the above-described example embodiments are merely examples of implementation for carrying out this disclosure, and the technical scope of this disclosure should not be interpreted as being limited thereto. That is, this disclosure can be implemented in various forms without departing from the technical idea thereof or the main characteristics thereof.

The whole or part of the example embodiments disclosed above can be described as, but not limited to, the following supplementary notes.

(Supplementary Note 1)

A gate system arranged between a first region and a second region, comprising:

a guide that defines a movement path of a user from the first region to the second region; and an imaging device that photographs the user to acquire an image used for biometric authentication, wherein the movement path includes a first portion in which the user is photographed and a second portion through which the user passes after being photographed, wherein the first portion extends from the first region toward the imaging device in a first direction that is parallel to an optical axis of the imaging device, and wherein the second portion extends from an end of the first portion in a second direction that is not parallel to the first direction.

(Supplementary Note 2)

The gate system according to supplementary note 1, wherein a focal point of an optical system of the imaging device is included in the first portion.

(Supplementary Note 3)

The gate system according to supplementary note 1 or 2, wherein at least a part of the second portion is included outside an imaging range of the imaging device.

(Supplementary Note 4)

The gate system according to any one of supplementary notes 1 to 3, wherein when the user is determined to be a registrant in the biometric authentication based on the image acquired by the imaging device, the user is guided to the second region.

(Supplementary Note 5)

The gate system according to any one of supplementary notes 1 to 4 further comprising an opening/closing member provided in the movement path so as to be opened or closed in accordance with a result of the biometric authentication.

(Supplementary Note 6)

The gate system according to supplementary note 5, wherein the opening/closing member is provided between the second portion and the second region.

(Supplementary Note 7)

The gate system according to supplementary note 5, wherein the opening/closing member is provided at a position in the first portion closer to the imaging device than a range in which the user is photographed.

(Supplementary Note 8)

The gate system according to supplementary note 5, wherein the opening/closing member is provided in the second portion.

(Supplementary Note 9)

The gate system according to any one of supplementary notes 1 to 8, wherein the biometric authentication is a method of matching the user using an image including an iris of the user.

(Supplementary Note 10)

The gate system according to any one of supplementary notes 1 to 9, wherein the biometric authentication is a method of matching the user using an image including an iris of the user and an image including a face of the user.

(Supplementary Note 11)

The gate system according to any one of supplementary notes 1 to 10 further comprising a first display device provided at a position closer to a beginning of the first portion than a range in which the user is photographed.

(Supplementary Note 12)

The gate system according to supplementary note 11, wherein the first display device displays information indicating whether or not entry into the first portion is possible.

(Supplementary Note 13)

The gate system according to any one of supplementary notes 1 to 12 further comprising a second display device provided at a position closer to the imaging device than a range in which the user is photographed.

(Supplementary Note 14)

The gate system according to supplementary note 13, wherein the second display device displays information indicating whether or not passing through the gate system is possible in accordance with a result of the biometric authentication.

(Supplementary Note 15)

The gate system according to any one of supplementary notes 1 to 14, wherein the movement path further includes a third portion through which the user passes after being photographed, and wherein the third portion extends from the end of the first portion in a third direction that is not parallel to the first direction.

(Supplementary Note 16)

The gate system according to supplementary note 15, wherein the user passed through the first portion is guided to either the second portion or the third portion in accordance with a result of the biometric authentication.

(Supplementary Note 17)

A gate system comprising a plurality of the gate systems according to supplementary note 16,
wherein the plurality of gate systems include a first gate system and a second gate system, and
wherein an end of the third portion of the first gate system is connected to a beginning of the first portion of the second gate system.

(Supplementary Note 18)

The gate system according to supplementary note 17, wherein when the user is not determined to be a registrant in the biometric authentication based on the image acquired by the imaging device of the first gate system, the user is guided from the first portion of the first gate system to the third portion of the first gate system.

REFERENCE SIGNS LIST 1 gate system
10, 10a, and 10b gate device
20 authentication device
101 control device
102 imaging device
103 guide
104 first display device
105 second display device
106 opening/closing member
107 storage device
121 visible light camera
122 iris imaging camera
122a infrared light irradiation device
122b infrared light camera
123 bandpass filter
124 half mirror
125 display unit
125a cover
126 housing
127 support post
128 support base
201 CPU
202 RAM
203 ROM
204 HDD
205 communication I/F
EN entrance
EX, EX1, EX2, and EX3 exit
F focal point
FL focal length
OA optical axis
R1, R2, R3, R4, R5, R6, and R7 region
U user

What is claimed is:

1. A system comprising a plurality of gate systems including a first gate system and a second gate system,
wherein each gate system is arranged between a first region and a second region and comprises:
a guide that defines a movement path of a user from the first region to the second region; and
an imaging device that photographs the user to acquire an image used for biometric authentication,
wherein the movement path includes a first portion in which the user is photographed, a second portion through which the user passes after being photographed, and a third portion through which the user passes after being photographed,
wherein the first portion extends from the first region toward the imaging device in a first direction that is parallel to an optical axis of the imaging device,
wherein the second portion extends from an end of the first portion in a second direction that is not parallel to the first direction,
wherein the third portion extends from the end of the first portion in a third direction that is not parallel to the first direction,
wherein the user that has passed through the first portion is guided to either the second portion or the third portion in accordance with a result of the biometric authentication, and
wherein an end of the third portion of the first gate system is connected to a beginning of the first portion of the second gate system.

2. The system according to claim 1, wherein a focal point of an optical system of the imaging device is included in the first portion.

3. The system according to claim 1, wherein at least a part of the second portion is included outside an imaging range of the imaging device.

4. The system according to claim 1, wherein when the user is determined to be a registrant in the biometric authentication based on the image acquired by the imaging device, the user is guided to the second region.

5. The system according to claim 1, wherein each gate system further comprises an opening/closing member provided in the movement path so as to be opened or closed in accordance with a result of the biometric authentication.

6. The system according to claim 5, wherein the opening/closing member is provided between the second portion and the second region.

7. The system according to claim 5, wherein the opening/closing member is provided at a position in the first portion closer to the imaging device than a range in which the user is photographed.

8. The system according to claim 5, wherein the opening/closing member is provided in the second portion.

9. The system according to claim 1, wherein the biometric authentication is a method of matching the user using an image including an iris of the user.

10. The system according to claim 1, wherein the biometric authentication is a method of matching the user using an image including an iris of the user and an image including a face of the user.

11. The system according to claim 1, wherein each gate system further comprises a first display device provided at a position closer to a beginning of the first portion than a range in which the user is photographed.

12. The system according to claim 11, wherein the first display device displays information indicating whether or not entry into the first portion is possible.

13. The system according to claim 1, wherein each gate system further comprises a second display device provided at a position closer to the imaging device than a range in which the user is photographed.

14. The system according to claim 13, wherein the second display device displays information indicating whether or not passing through the gate system is possible in accordance with a result of the biometric authentication.

15. The system according to claim 1, wherein when the user is not determined to be a registrant in the biometric authentication based on the image acquired by the imaging device of the first gate system, the user is guided from the first portion of the first gate system to the third portion of the first gate system.

\* \* \* \* \*